Figure 8:
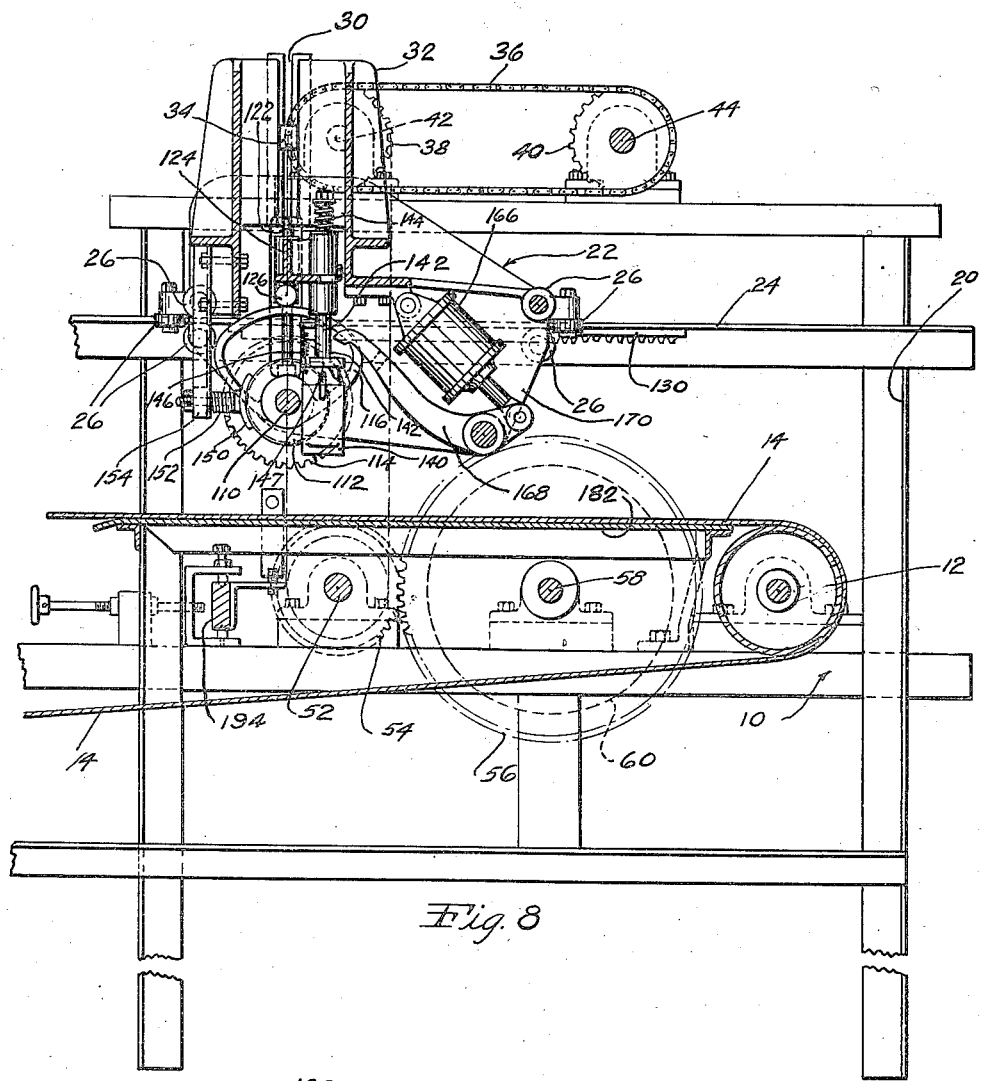

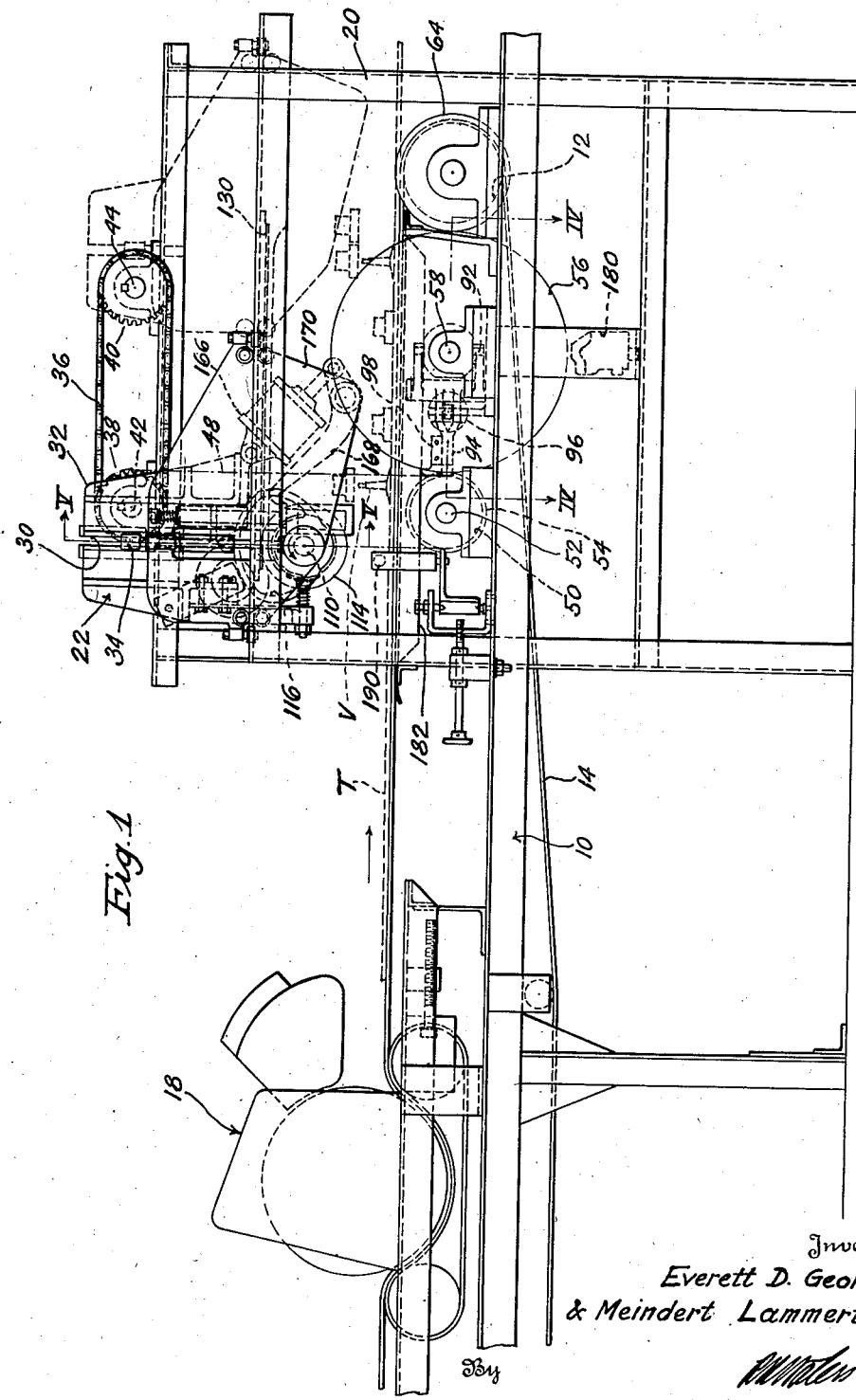

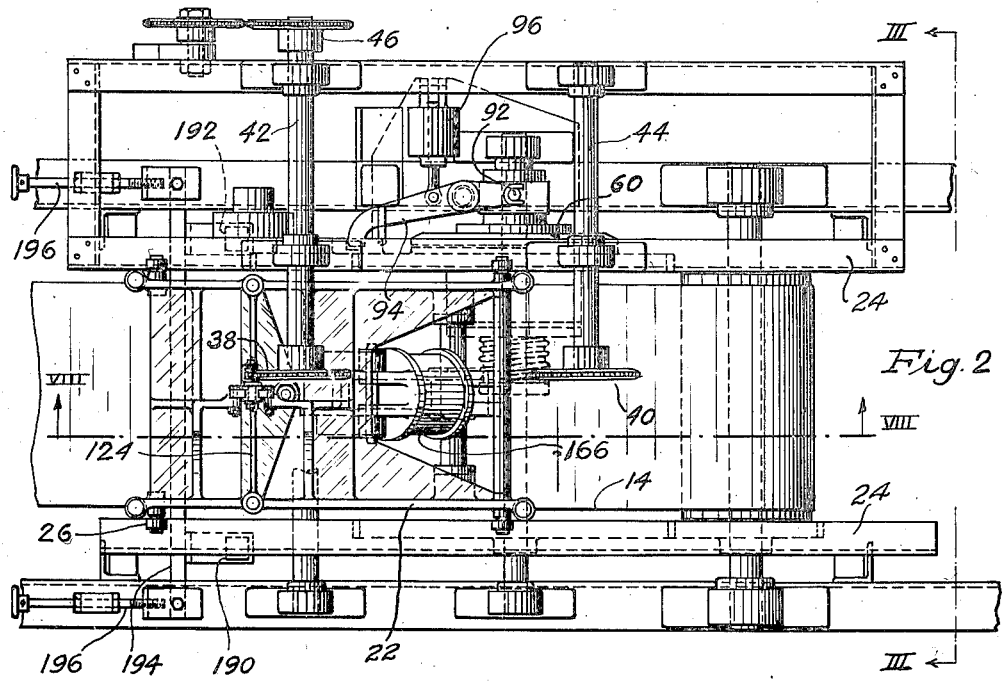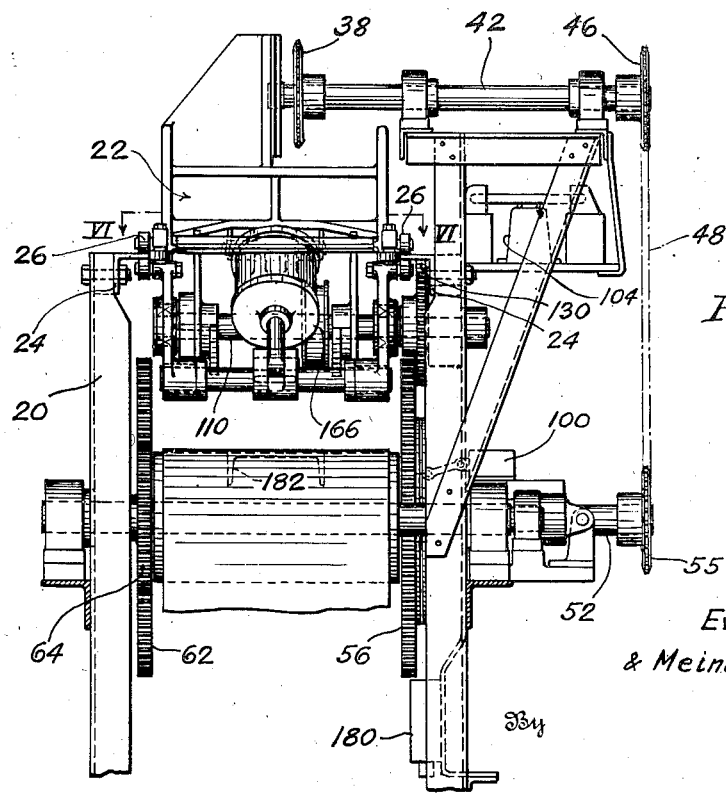

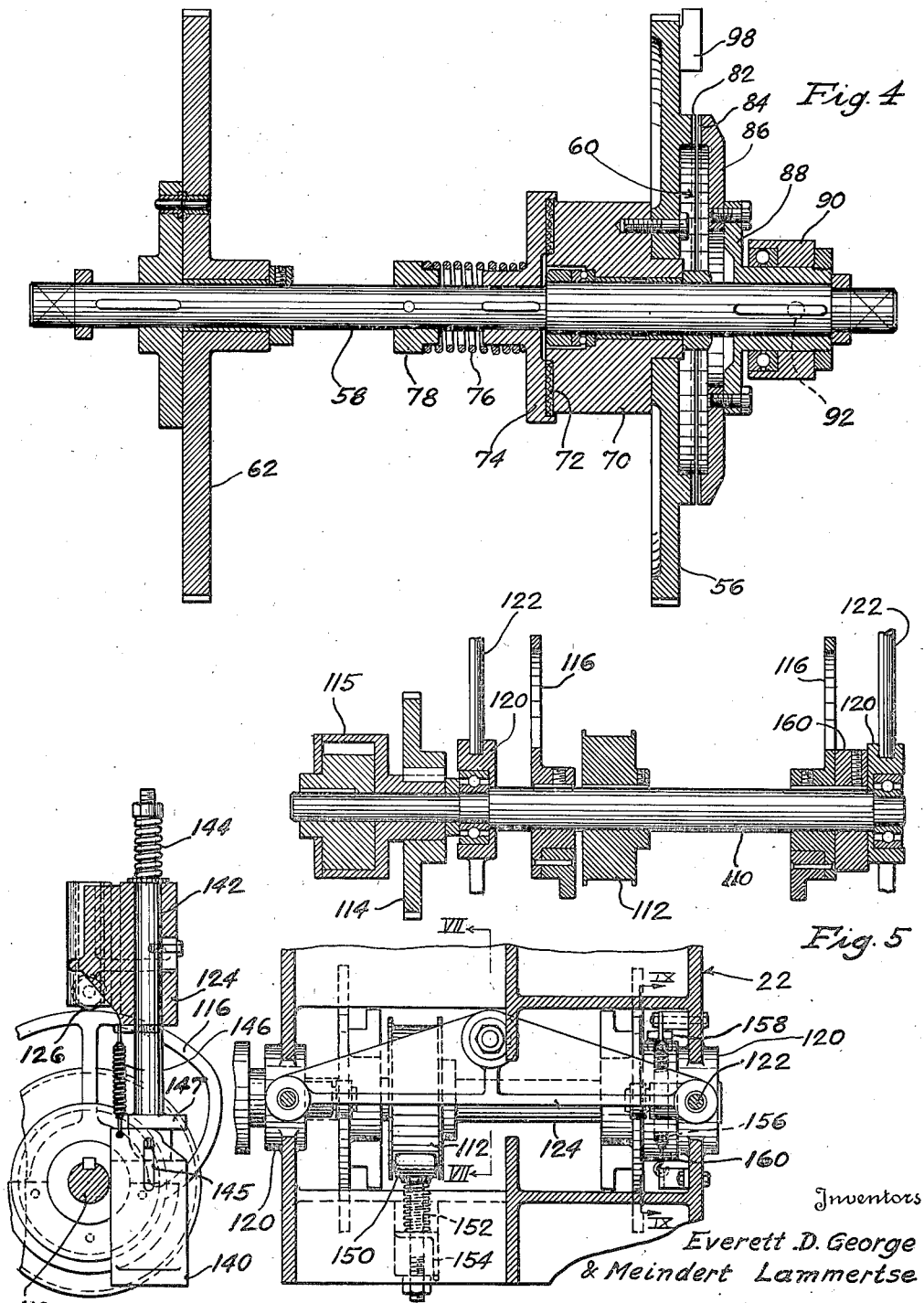

Nov. 6, 1945.  E. D. GEORGE ET AL  2,388,652

VALVE STITCHING APPARATUS

Filed May 29, 1943   4 Sheets-Sheet 4

Inventor
Everett D. George
& Meindert Lammertse

By
Attorney

Patented Nov. 6, 1945

2,388,652

UNITED STATES PATENT OFFICE 2,388,652

VALVE STITCHING APPARATUS

Everett D. George and Meindert Lammertse, Akron, Ohio, assignors to Wingfoot Corporation, Akron, Ohio, a corporation of Delaware Application May 29, 1943, Serial No. 489,104

15 Claims. (Cl. 154—9)

This invention relates to apparatus for forceably securing a plurality of separate articles in turn to another continuously moving article or articles, and, more particularly, is concerned with stitching rubber valve stems in position on an extruded rubber inner tube.

In the manufacture of rubber inner tubes for use in conjunction with pneumatic tires for vehicles, it has been the practice in recent years to extrude the rubber stock in the form of a flattened tube which is carried by suitable conveyors passing stations where the extruded tube is cut to proper length, the valve stem hole is punched, and a rubber valve stem is secured to the tube over the hole. Thereafter, the lengths of inner tube are joined to form endless tubes by suitable splicing equipment and the inner tubes are vulcanized in full circle molds.

Heretofore, rubber valve stems have been positioned by hand on the inner tube and then suitable hand operated stitching means are utilized to adequately secure the valve stems in position. Often this procedure has been further complicated by the use of cement. In any event, it has not been convenient to perform the valve stitching operation upon a continuously moving conveyor, and, as a result the hand application of the valve stems by stitching to the inner tube has been done with the inner tubes stationary which interrupts a continuous flow of work past operator stations and adds to the cost of tube manufacture. Also, the hand application of valve stems to inner tubes has resulted in non-uniform application of the stems to the tube and requires considerable operator time.

It is the general object of the invention to avoid and overcome the foregoing and other difficulties of and objections to known methods and apparatus for securing rubber valve stems to extruded inner tubes by the provision of improved apparatus for rapidly, efficiently, and inexpensively fastening inner tube valve stems to extruded tubes.

Another object of the invention is to provide relatively inexpensive, easily operated apparatus for automatically stitching rubber valve stems to an inner tube which is continuously carried upon a moving conveyor so that the normal flow of production material from one station to another is not interrupted and manufacturing efficiencies are kept high.

Another object of the invention is to provide automatically actuated and operated apparatus for separately securing at spaced intervals a plurality of articles, such as rubber valve stems, to a continuously conveyed object or objects, such as an inner tube.

Another object of the invention is the provision of improved means for stitching a valve stem or the like to a continuously conveyed inner tube or the like by imparting a blow or a steady force to the valve stem as it is carried along by the inner tube.

Another object of the invention is to provide automatic apparatus including conveying means, means positioned above the conveying means and adapted to be moved longitudinally back and forth above the conveyor, and means carried by the carriage means adapted to move down over a valve stem, or the like, carried by the conveyor and adapted to impart a stitching force to the valve stem to secure it to an object, such as an inner tube carried by the conveyor.

Another object of the invention is the provision of relatively inexpensive, long wearing, easily operated apparatus for applying articles in turn to a continuously moving article or articles.

The foregoing and other objects of the invention are achieved by the provision of apparatus including means for conveying an inner tube or the like, a carriage mounted for longitudinal movement back and forth at the same speed as the conveying means and positioned above the conveying means, a valve stem stitcher mounted on the carriage, means for moving the stitcher to and from a position over a valve stem carried on the inner tube, and means for imparting to the stitcher when over the valve stem a force to secure the valve stem in position on the tube.

Figure 9:
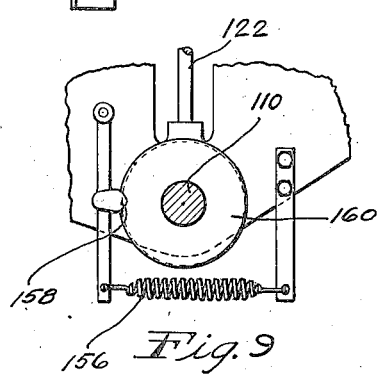

For a better understanding of the invention reference should be had to the accompanying drawings wherein Fig. 1 is a side elevation of one embodiment of apparatus incorporating the principles of the invention; Fig. 2 is a plan view of the apparatus illustrated in Fig. 1; Fig. 3 is an end elevation of the apparatus of Fig. 2, taken substantially in the direction of line III—III of Fig. 2; Fig. 4 is a horizontal cross sectional view taken substantially on line IV—IV of Fig. 1; Fig. 5 is a vertical cross sectional view taken substantially on line V—V of Fig. 1; Fig. 6 is a horizontal cross sectional view taken substantially on line VI—VI of Fig. 3; Fig. 7 is a transverse vertical cross sectional view taken substantially on line VII—VII of Fig. 6; Fig. 8 is a longitudinal vertical sectional view taken on line VIII—VIII of Fig. 2; and Fig. 9 is a vertical sectional view taken on line IX—IX of Fig. 6.

Referring more particularly to the drawings, it will be understood that the principles of the invention can be employed in a variety of capacities wherein it is advisable to secure a plurality of similar articles along an elongated article continuously carried by a conveyor. However, the invention is particularly concerned with apparatus for automatically applying rubber valve stems to an extruded rubber tube or tubes, and, accordingly, has been so particularly illustrated and will be so described.

In the drawings, the numeral 10 indicates generally a frame serving to journal a pulley 12, which in turn supports an endless conveyor belt 14. The conveyor 14 operates to support and continuously advance an extruded inner tube T which reclines on the conveyor in flattened form. A rubber valve stem marked V is positioned on top of the extruded tube T at periodically recurrent points which ordinarily are appropriately marked by a valve stem hole cut into the inner tube, for example, by the provision of mechanism, indicated as a whole by the numeral 18, and, forming no part of the present invention. With the conveyor 14 and the tube T moving in the direction of the arrow, a valve stem V is ordinarily positioned by hand over the valve stem hole cut in the inner tube so that the valve stem is ready to be stitched into position on the tube.

The mechanism for stitching the valve stem in place on the tube during the continuous forward feeding movement of the tube and stem includes a framework 20 supported on the conveyor frame 10 and extending up above the upper stretch of the conveyor 14 and serving to slidably support a carriage, indicated as a whole by the numeral 22, for movement longitudinally back and forth above the conveyor 14. The carriage 22 may be conveniently supported upon the frame work 20 by providing horizontally extending tracks or flanges 24 at each side of the framework upon which ride both horizontally and vertically journalled rollers 26 mounted on the carriage 22. The position of the carriage 22 with respect to the framework 20 is determined by apparatus which effects a longitudinal back and forth movement of the carriage above the conveyor at the same speed as the conveyor.

This movement is achieved by the provision of a vertical slot 30 in an upwardly extending bracket 32 formed on the carriage which slot slidably receives a block 34 pivotally fastened to an endless chain 36 extending between sprockets 38 and 40. The sprockets 38 and 40 are secured to shafts 42 and 44 respectively journalled in the framework 20, and the shaft 42 has a sprocket 46 secured to its outside end and connected by a chain 48 with a sprocket 50 mounted upon the end of a shaft 52. The shaft 52, also journalled in the framework 20, carries a gear 54 which mates with a large gear 56 carried on a shaft 58 but releasably secured thereto by a clutch, which is indicated as a whole by the numeral 60. The other end of the shaft 58 carries a large gear 62 which mates with a gear 64 carried by the shaft of pulley 12 whereby the drive on the conveyor 14 operating the pulley 12 serves to move the carriage 22 longtudinally back and forth when the clutch 60 is engaged and operating through the mechanism last described.

The clutch 60, as best seen in Fig. 4, includes a hub portion 70 secured to the gear 56 and rotatably mounted on the shaft 58. The hub 70 engages through a friction facing 72 with a drag clutch plate 74 keyed for sliding but non-rotative movement on the shaft 58, the drag clutch plate 74 being forced against the facing 72 by a compression spring 76 positioned between the clutch plate and a collar 78 secured to the shaft 58. The face of the gear 56 opposite to the hub 70 carries an integral circular series of teeth, indicated by the numeral 82, which are adapted to engage with a complementary tooth clutch 84 formed on a periphery of a disc member 86 secured to a hub 88 mounted in slidably keyed relation on the shaft 58. Surrounding the hub 88 is a collar 90, carrying pins 92 which are engaged by a clevis 94 pivotally mounted on the framework 20 and operated by an air cylinder 96 to thereby control the engagement and disengagement of the tooth clutch.

The end of the clevis 94 is extended into association with the outer periphery of the gear 56, and a lug 98 secured to the outer periphery of the gear is adapted to engage with the inwardly turned end of the clevis 94 so that the gear 56 cannot be rotated by the drag clutch unless the clevis 94 is moved out of position by the air cylinder 96. The drag clutch mechanism 70, 72, 74, and 76 serves to coordinate the speed of movement of the gear 56 and the shaft 58 without clashing of the teeth 82 and 84. Also, the lug 98 serves to actuate an electric switch 100 to operate a solenoid controlled air valve 104 which causes the actuation of the air cylinder 96 to disengage the clutch 60 at the end of an operating cycle of the apparatus as hereinafter described.

Turning now to a more detailed consideration of the carriage 22 and of the valve stitching means associated therewith, and having reference to Figs. 5, 6, and 7, the carriage 22 journals a shaft 110 to which is fastened a brake drum 112, a gear 114 secured to an overrunning or one way clutch 115 keyed to the shaft, and spaced arcuate cams 116. The bearing housings for the shaft 110, forming a part of the carriage 22, have been indicated by the numeral 120, and these bearing housings serve to support vertical rods 122 upon which are slidably supported a cross head 124 for vertical movement with respect to the carriage. The vertical position of the cross head 124 is controlled by journalling on the cross head a pair of rollers 126 each one of which engage with a cam 116 so that as the shaft 110 is rotated by the engagement of the gear 114 with a rack 130 on the framework 20, the cross head 124 is given an upward and downward movement on the rods 122 as determined by the contour of the cams 116. Due to the overrunning clutch 115 the shaft 110 is periodically angularly advanced in only one direction upon the reciprocating movement of the carriage 22.

The cross head 124 centrally carries a valve stitching head 140 upon a bar 142 slidably received in a vertical bore in the cross head, and resiliently held in an uppermost position by a compression spring 144, but adapted, as hereinafter described, to be forced downwardly against the yielding action of the spring. In order to prevent possible breakage of any parts due to work jamming, the head 140 is secured to the bottom end of the bar 142 with a pin and slot connection 145 but is held in firm vertically downward load transmitting relation by a tension spring 146 which normally holds the flat upper end of the head 140 against the enlarged and flattened lower end 147 of the bar 142.

Associated with the brake drum 112 is a brake shoe 150 which is yieldably urged against the drum by a compression spring 152. The brake shoe 150 is carried upon a downwardly extending bracket and associated bolt 154, with the bracket being secured to the carriage 22. This brake acts to check any tendency of the shaft 24 to overrun the starting or stopping position of the carriage. Other means may also be included to further achieve this purpose, and these may take the form of a tension spring 156 adapted to urge a pointed block 158 into a groove cut in the periphery of a hub member 160 mounted on the shaft 110 in association with one of the cams 116. See Fig. 9.

The carriage 22 also mounts suitable means for applying a considerable force to the valve stitcher 140 when the stitcher is lowered down over the valve stem V carried by the inner tube T. The force applying means conveniently take the form of an air cylinder 166 pivotally secured at one end to the carriage and having its piston rod pivotally fastened to a bell crank 168 which is pivoted in downwardly extending brackets 170 formed integral with the carriage 22. The bell crank 168 extends to a position adjacent the valve stitcher 140 and is bifurcated so that the end of the crank 168 comes down and engages with the top of the enlarged lower end 147 of the bar 142. Thus, the actuation of the air cylinder 166 causes a heavy force or blow to be imparted to the valve stitcher 140 to securely stitch the valve stem on the inner tube. The operation of the air cylinder 166 is achieved by the actuation of an air valve 180 by the lug 98 carried by the gear 56.

A channel 182 mounted beneath the conveyor 14 and carried by the framework 20 serves as an anvil to take the force of the stitcher 140.

The apparatus is adapted to be automatically initiated into the operation every time a valve stem V reaches the proper point during the travel of the inner tube and valve stem over the conveyor 14. The initiation of the operation is controlled by the provision of an electric eye 190 and a light source 192 which are mounted upon a bar 194 whose position is determined by suitable adjustable bracket and screw mechanism 196 carried by the framework 20. The valve stem V passing between the light source 192 and the electric eye 190 serves to break the light ray and to energize the electric solenoid 104 to thereby operate the air cylinder 96 and engage the clutch 60. This action causes the chain 36 to begin to rotate to move the carriage 22 along above the conveyor 14 at the same speed and in the same direction as the conveyor.

The rotation of the shaft 110, as caused by the engagement of the gear 114 with the rack 130 on the framework 20, causes the cross head 124 of the carriage to begin to lower the valve stitcher 140 over the top of the valve stem. Once the stitcher is over the valve stem and has been lowered, the lug 98 will strike the air valve 180 to operate the air cylinder 166 and thereby cause the bell crank 168 to move down over the valve stitcher 140 and apply a considerable force or blow to the valve stitcher to thereby secure the valve stem to the inner tube. Thereafter, the air cylinder 166 is operated in the reverse direction to move the bell crank 168 away from the valve stitcher, the cross head 124 is raised by the cams 116 to move the stitcher 140 back off the valve stem, and the continued operation of the chain 36 will return the carriage 22 to its initial position. Just prior to reaching its initial position the lug 98 on the gear 56 strikes the electric switch 100 to thereby operate the electric solenoid 104 and the air cylinder 96 to disengage the clutch 60. Thus, the apparatus is repositioned for automatic operation upon the occasion of the next valve stem passing in front of the electric eye.

From the foregoing, it will be recognized that the objects of the invention have been achieved. An improved relatively inexpensive, easily operated, uniform pressure apparatus is provided for automatically securing objects to a moving conveyor, and specifically a rubber valve stem to an extruded inner tube. The improved apparatus is entirely automatic and is operated directly by the movement of a valve stem into and through the apparatus, and stitching pressures of any desired amount can be used to obtain uniform and exceptionally high production valve stitching results.

While in accordance with the patent statutes the invention has been specifically illustrated and described, it will be appreciated that the invention is not to be limited thereto or thereby, but that the scope thereof is defined in the appended claims.

What is claimed is:

1. Apparatus for stitching valve stems to an extruded inner tube and including means for continuously conveying the inner tube, a carriage, means mounting the carriage for longitudinal movement above the conveying means, means for moving the carriage longitudinally at the same speed as the conveying means, a valve stem stitcher mounted on the carriage, means controlled by the movement of the carriage for moving the stitcher to and from a position over a valve stem carried on the inner tube, means other than the last-named means for imparting force to the stitcher when over the valve stem to secure the valve stem in position on the tube, and adjustable electric eye means controlling the initiation of the movement of the carriage.

2. Apparatus for stitching valve stems to an extruded inner tube and including means for continuously conveying the inner tube, a carriage, means mounting the carriage for longitudinal movement above the conveying means, means for moving the carriage longitudinally back and forth at the same speed as the conveying means, a valve stem stitcher mounted on the carriage, means for moving the stitcher to and from a position over a valve stem carried on the inner tube, means for imparting force to the stitcher when over the valve stem to secure the valve stem in position on the tube, and adjustable means controlling the initiation of the movement of the carriage.

3. Apparatus for stitching valve stems to an extruded inner tube and including means for continuously conveying the inner tube, a carriage, means mounting the carriage for longitudinal movement above the conveying means, means for moving the carriage longitudinally back and forth at the same speed as the conveying means, a valve stem stitcher mounted on the carriage, means for moving the stitcher to and from a position over a valve stem carried on the inner tube, and means other than the last-named means for imparting force to the stitcher when over the valve stem to secure the valve stem in position on the tube.

4. Apparatus for securing an article to a continuously conveyed object and including means for continuously conveying the object, a carriage, means mounting the carriage for longitudinal movement above the conveying means, means for moving the carriage longitudinally back and forth at the same speed as the conveying means, means mounted on the carriage and adapted to surround and engage with an article carried on the object, means controlled by the movement of the carriage for moving the article engaging means to and from a position over an article carried on the object, means for imparting force to the article engaging means when over the article to secure it in position on the object, and electric eye means operated by the position of the article for controlling the initiation of the operation of the carriage.

5. Apparatus for securing an article to a continuously conveyed object and including means for continuously conveying the object, a carriage, means mounting the carriage for longitudinal movement above the conveying means, means for moving the carriage longitudinally back and forth at the same speed as the conveying means, means mounted on the carriage and adapted to surround and engage with an article carried on the object, means for moving the article engaging means to and from a position over an article carried on the object, means for imparting force to the article engaging means when over the article to secure it in position on the object, and means operated by the position of the article for controlling the initiation of the operation of the carriage.

6. Apparatus for securing an article to a continuously conveyed object and including means for continuously conveying the object, a carriage, means mounting the carriage for longitudinal movement above the conveying means, means for moving the carriage longitudinally back and forth at the same speed as the conveying means, means mounted on the carriage and adapted to surround and engage with an article carried on the object, means controlled by the movement of the carriage for moving the article engaging means to and from a position over an article carried on the object, and means for imparting force to the article engaging means when over the article to secure it in position on the object.

7. Apparatus for securing an article to a continuously conveyed object and including means for continuously conveying the object, a carriage, means mounting the carriage for longitudinal movement above the conveying means, means for moving the carriage longitudinally back and forth at the same speed as the conveying means, and means mounted on the carriage and adapted to surround and engage with an article carried on the object and stitching it thereto, and means controlled by the movement of the carriage for moving the article engaging means to and from a position over an article carried on the object.

8. Apparatus for stitching valve stems to an extruded inner tube, and including means for conveying the inner tube, a carriage, means mounting the carriage for longitudinal movement above the conveying means, means driven by the conveying means for moving the carriage longitudinally back and forth at the same speed as the conveying means, a clutch in said carriage moving means, a valve stem stitcher mounted for vertical movement on the carriage, cam means operable upon movement of the carriage for moving the stitcher to and from a position over a valve stem carried on the inner tube, fluid pressure cylinder means for imparting force to the stitcher when over the valve stem to secure the valve stem in position on the tube, and means operated by the position of the valve stem on the tube for controlling the operation of the clutch.

9. Apparatus for stitching valve stems to an extruded inner tube, and including means for conveying the inner tube, a carriage, means mounting the carriage for longitudinal movement above the conveying means, means driven by the conveying means for moving the carriage longitudinally back and forth at the same speed as the conveying means, a clutch in said carriage moving means, a valve stem stitcher mounted for vertical movement on the carriage, cam means operable upon movement of the carriage for moving the stitcher to and from a position over a valve stem carried on the inner tube, and means operated by the position of the valve stem on the tube for controlling the operation of the clutch.

10. Apparatus for securing a member to an elongated element and including means for conveying the element, a carriage, means mounting the carriage for longitudinal movement above the conveying means, means driven by the conveying means for moving the carriage longitudinally back and forth at the same speed as the conveying means, a clutch in said carriage moving means, a force-imparting mechanism mounted for vertical movement on the carriage, means for moving the mechanism to and from a position over a member carried on the element, fluid pressure cylinder means for imparting force to the mechanism when over the member to secure the member in position on the element, and means operated by the position of the member on the element for controlling the operation of the clutch.

11. Apparatus for stitching valve stems to an extruded inner tube and including means for conveying the inner tube, a carriage, means mounting the carriage for longitudinal movement above the conveying means, means driven by the conveying means for moving the carriage longitudinally back and forth at the same speed as the conveying means, a clutch in said carriage moving means, a valve stem stitcher mounted for vertical movement on the carriage, means for moving the stitcher to and from a position over a valve stem carried on the inner tube, and means operated by the position of the valve stem on the tube for controlling the operation of the clutch.

12. Apparatus for securing a member to an element and including means for conveying the element, a carriage, means mounting the carriage for longitudinal movement above the conveying means, means driven by the conveying means for moving the carriage longitudinally back and forth at the same speed as the conveying means, a clutch in said carriage moving means, said clutch when disengaged interrupting the operation of the carriage moving means, a member-securing mechanism mounted for vertical movement on the carriage, means operable upon movement of the carriage for moving the mechanism to and from a position over a member carried on the element, and means controlled by the position of the member for engaging the clutch.

13. Apparatus for stitching valve stems to an extruded inner tube and including means for continuously conveying the inner tube, a valve stem stitcher, means for moving the stitcher to and from a position over a valve stem carried on the continuously conveyed inner tube, separate means for imparting force to the stitcher when over the valve stem to secure the valve stem in position on the tube, and means set into operation by the valve stem for controlling the initiation of the operation of the stitcher moving means.

14. Apparatus for stitching valve stems to an extruded inner tube and including means for continuously conveying the inner tube, a valve stem stitcher, means for moving the stitcher to and from a position over a valve stem carried on the continuously conveyed inner tube, and means initiated into operation by the valve stem for controlling the operation of the stitcher moving means.

15. Apparatus for stitching valve stems to an extruded inner tube and including means for continuously conveying the inner tube, a valve stem stitcher, means for moving the stitcher to and from a position over a valve stem carried on the continuously conveyed inner tube, and separate means for imparting force to the stitcher when over the valve stem to secure the valve stem in position on the tube.

EVERETT D. GEORGE.
MEINDERT LAMMERTSE.